US009329073B2

(12) United States Patent
Sai

(10) Patent No.: US 9,329,073 B2
(45) Date of Patent: May 3, 2016

(54) ADAPTIVE RADAR SYSTEM WITH MUTLIPLE WAVEFORMS

(71) Applicant: HONEYWELL INTERNATIONAL INC., Morristown, NJ (US)

(72) Inventor: Bin Sai, Zuid Holland (NL)

(73) Assignee: Honeywell International Inc., Morristown, NJ (US)

( * ) Notice: Subject to any disclaimer, the term of this patent is extended or adjusted under 35 U.S.C. 154(b) by 392 days.

(21) Appl. No.: 14/099,105

(22) Filed: Dec. 6, 2013

(65) Prior Publication Data

US 2015/0160066 A1 Jun. 11, 2015

(51) Int. Cl.
| | |
|---|---|
| G01F 23/284 | (2006.01) |
| G01S 7/34 | (2006.01) |
| G01S 13/88 | (2006.01) |
| G01S 7/285 | (2006.01) |
| G01S 13/10 | (2006.01) |
| G01S 13/26 | (2006.01) |
| G01S 13/28 | (2006.01) |
| G01S 13/02 | (2006.01) |
| G01S 7/52 | (2006.01) |
| G01S 7/40 | (2006.01) |

(52) U.S. Cl.
CPC .............. *G01F 23/284* (2013.01); *G01S 7/285* (2013.01); *G01S 7/4008* (2013.01); *G01S 13/106* (2013.01); *G01S 13/26* (2013.01); *G01S 13/282* (2013.01); *G01S 7/34* (2013.01); *G01S 7/52033* (2013.01); *G01S 13/0209* (2013.01); *G01S 13/88* (2013.01); *G01S 2007/4013* (2013.01)

(58) Field of Classification Search
CPC ....... G01S 7/34; G01S 7/489; G01S 7/52033; G01S 7/529; G01S 7/5354; G01S 13/88; G01F 23/284; G01F 23/2845
USPC ........................................................ 342/124
See application file for complete search history.

(56) References Cited

U.S. PATENT DOCUMENTS

| | | | | |
|---|---|---|---|---|
| 4,058,809 | A | 11/1977 | Chudleigh, Jr. | |
| 4,194,200 | A * | 3/1980 | Goldie ................. | H03G 11/025 333/13 |
| 5,719,579 | A | 2/1998 | Torre et al. | |
| 6,781,540 | B1 * | 8/2004 | MacKey ................ | G01S 13/90 342/188 |
| 8,098,193 | B2 * | 1/2012 | Sai ...................... | G01S 13/0209 342/102 |
| 8,334,802 | B2 * | 12/2012 | Ogawa .................. | G01S 7/023 342/118 |

(Continued)

*Primary Examiner* — Peter Bythrow
(74) *Attorney, Agent, or Firm* — Jetter & Associates, P.A.

(57) ABSTRACT

A pulsed radar method of sensing or measuring a product material in a storage tank. A plurality of waveform types are automatically selected based on a power limitation. The pulsed radar signal is transmitted by a programmable transmitter to the product material, wherein the pulsed radar signal is reflected or scattered by the product material to provide a radar signal during an interval of time including a target signal. An initial gain or attenuation is automatically set for a programmable receiver. The programmable receiver receives the radar signal including the target signal during the interval of time, and the target signal is signal processed using a lower attenuation setting as compared to the initial gain or attenuation to determine at least one parameter associated with the product material. The transmitted and received radar signal can also be adjusted according to the measured SNR.

15 Claims, 6 Drawing Sheets

(56) References Cited

U.S. PATENT DOCUMENTS

| | | | |
|---|---|---|---|
| 2008/0136704 A1* | 6/2008 | Chan | G01S 7/282 342/201 |
| 2008/0316086 A1 | 12/2008 | Hoctor et al. | |
| 2009/0033543 A1* | 2/2009 | Nilsson | G01F 23/284 342/124 |
| 2010/0109963 A1* | 5/2010 | Kienzle | G01F 23/284 343/786 |
| 2010/0223019 A1* | 9/2010 | Griessbaum | G01F 23/2962 702/75 |
| 2010/0265121 A1* | 10/2010 | Bandhauer | G01S 7/2923 342/135 |
| 2013/0076559 A1* | 3/2013 | Edvardsson | G01S 13/36 342/124 |
| 2013/0229297 A1* | 9/2013 | Mukai | G01S 7/28 342/92 |
| 2013/0250460 A1* | 9/2013 | Grozinger | G01F 15/06 361/54 |
| 2015/0338261 A1* | 11/2015 | Mueller | G01S 7/032 342/124 |

* cited by examiner

ADAPTIVE RADAR SYSTEM WITH MUTLIPLE WAVEFORMS

FIELD

Disclosed embodiments relate to systems and methods for determining the level of a product material in a storage tank by using pulsed radar signals emitted toward the product material surface and analyzing radar signals reflected from the product surface.

BACKGROUND

It is standard practice to use large metal storage tanks for storing a variety of liquids, such as beverage and petroleum products. Conventional large storage tanks are usually made from non-stainless steel plates, and in the case of petroleum products the storage tanks are generally made from ¼ inch (0.63 cm) to ½ inch (1.27 cm) thick steel plates welded together. The dimensions of conventional large storage tanks usually range in the hundreds of feet (100 feet=30.5 meters) in height and hundreds of feet in diameter.

Non-contact electromagnetic detection and sensing may be used to determine the presence or signatures (object classification or shape) of objects, or levels or the distance to the surface of product materials, when other sensing methods have difficulty in providing reliable and/or accurate information. For example, in the oil and gas industry, inaccurate or unreliable tank level measurements can incur a significant loss of profitability/revenue in tank level gauging applications. An error of 1 millimeter (mm) of the level measurement in bulk storage tanks (40-80 meters in diameter) can correspond to volumetric error of several cubic meters. Since the crude oil price is generally at least $100 per barrel (1 barrel=42 US gallons; 159 liters), the 1-mm error can result in thousands of dollars loss for one or more parties involved in trading and oil transfer.

RAdio Detection And Ranging (Radar) has been used as a type of non-contact product level gauge for several decades. The radar system includes a transmitter coupled to a radar antenna which is positioned above the product (e.g., a liquid or solid) for emitting radar signals to the product and a receiver coupled to the antenna (or to another antenna) for receiving radar signals reflected from the product surface, as well as a signal processor for determining the product level on the basis of the emitted radar signals and the reflected radar signals. According to this method, the antenna driven by transmit circuitry emits a radar signal which strikes an object or surface, for example a liquid surface. The object or surface reflects part of the emitted radar signal/wave back in the direction of the antenna, which is received and is coupled to receive circuitry including a processor that processes the reflected radar signal/wave.

However, radar measurements can be affected by multiple reflections inside storage tanks such as due to tank walls, the tank bottom, the tank roof and tank obstructions including agitators, ladders and the heat coil. Furthermore, every tank generally has to use the maximum capacity for oil storage and transfer. It is thus important that the measurements be constantly reliable as the level of product approaches the bottom or the roof of the storage tank.

In addition, European Union' (EU) regulations have already imposed restrictions on using high radar power in open air and plastic storage tanks due to spectrum interference to other devices and/or systems, and the U.S. Federal Communication Commission (FCC) may devise a new rule similar to EU's. Low transmit power is known to worsen the performance of pulsed radar. Some proposed solutions' include so-called adaptive power control (APC) that reduces the transmit power when there are other devices in the vicinity of the installed radar level gauge system. But simply using reduced power means the measuring distance and/or the signal to noise ratio (SNR) is reduced. As a result, the measurement accuracy is degraded, hence measurement uncertainty and errors are increased.

To improve measurement accuracy, ultra-short radar pulses in the sub-nanosecond range have been proposed. However, the shorter a pulse is, the lower its power, and hence the shorter the measuring distance. Given a specified SNR and measurement accuracy, the maximum measuring distance has to be reduced on one hand. On the other hand, the measurement accuracy is degraded at a longer distance, i.e., reduced reliability of pulse radar system with distance and transparency of the product (e.g., dielectric constant<1.4) to radar waves.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include adaptive multi-waveform radar systems having both a programmable transmitter (Tx) that can generate multiple-waveforms and a programmable receiver (Rx) having programmable attenuation or gain. A first of an available plurality of waveform types are adaptively and automatically selected from based on a power limitation for the radar system, such as based on a duration and/or amplitude of a current or voltage supply provided. A processor can dynamically adjust the radar system's power budget during radar operation so that both relatively strong signals and relatively weak signals can be detected with a signal to noise (SNR) above about 25 dB, which ensures good measuring range and level accuracy.

DETAILED DESCRIPTION

Figure 1A:
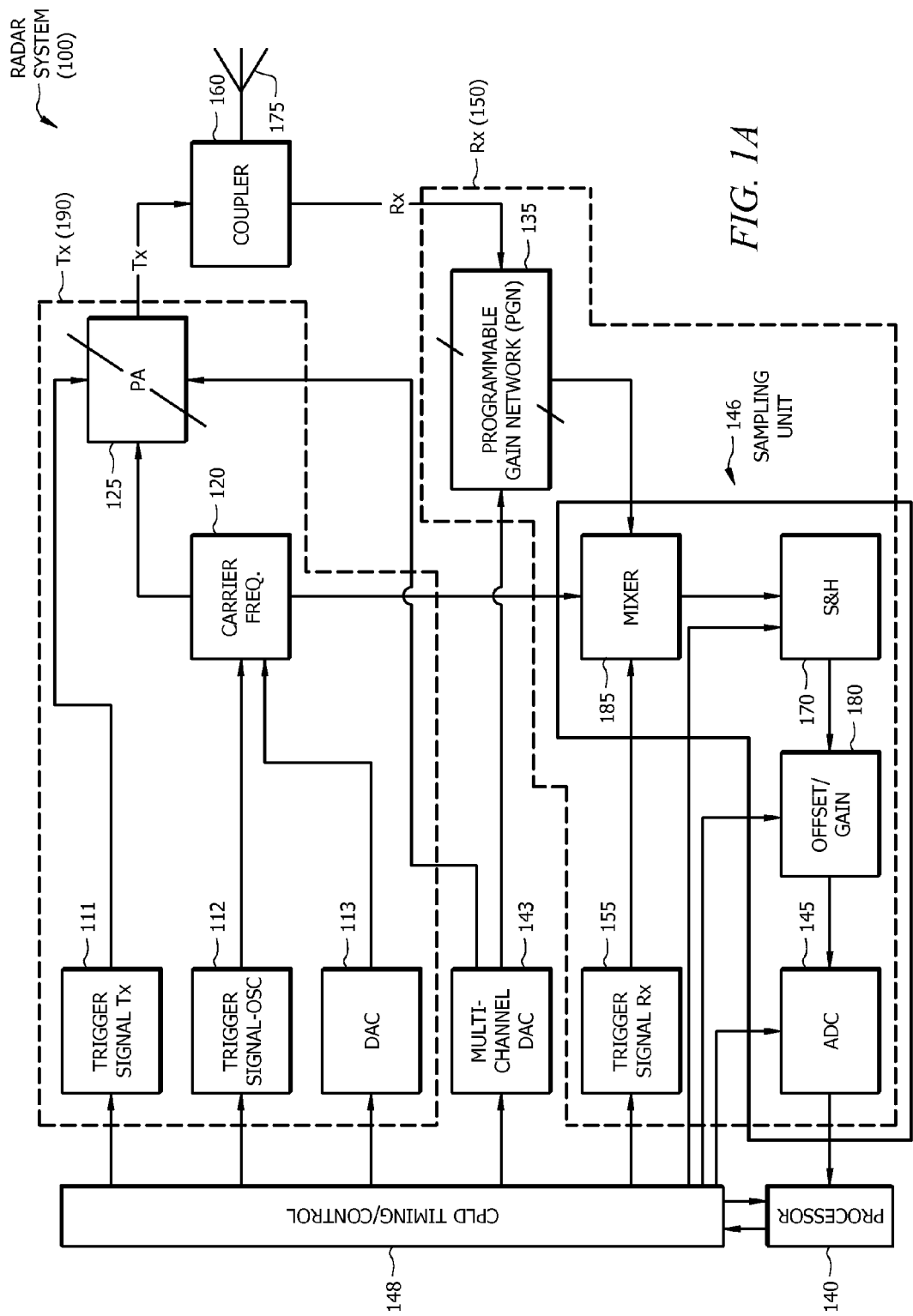
FIG. 1A is a block diagram of an example adaptive pulsed multi-waveform radar system having a programmable Tx with multiple waveform generation capability and programmable Rx that provides programmable attenuation or gain, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed adaptive multi-waveform pulse radar systems are designed so that the radar accuracy over long range (relatively long distances, e.g., >50 m) will remain essentially the same without compromising two simultaneous conflicting parameters, those being (i) accuracy versus distance, with a high pulse amplitude (for distance) versus short pulse width (for accuracy), and (ii) high dielectric constant (for high SNR) versus low dielectric constant (for low SNR) of the product material in the tank. Disclosed adaptive multi-waveform pulse radar systems include a programmable Tx that can generate multiple-waveforms and a programmable receiver including a PGN block, where a processor (e.g., digital signal processor (DSP) or microcontroller unit (MCU)) automatically and adaptively selects the waveform type, and adjusts the receive attenuation or gain based on power conditions. The radar system can also optionally adjust the Tx pulse power during system operation, based on a predetermined SNR level.

The Tx circuitry is configured to provide multiple waveform types, including for example pulsed CW waveforms, pulsed LFM waveforms, pulsed SFCW waveforms and pulsed FMCW waveforms, for different applications based on the power conditions (e.g., duration and amplitude of the current supply and/or voltage supply) or other power limitations (e.g., a government regulatory limitation presented by the particular application). For example, if the power supply for the disclosed multi-waveform pulsed radar system in a particular application is very limited, such as 4-20 mA loop power, then the waveform adaptively selected can be a relatively short pulse with a CW waveform inside the pulse. The pulse width of the CW radar pulse can be sub-nanosecond, typically ranging from tens to hundreds of picoseconds, corresponding to a 3-dB bandwidth of at least 2 GHz. Pulsed CW is recognized to be well suited for low power operation, because the carrier frequency for CW waveforms is fixed, rather than sweeping. The pulse width can be short (e.g., sub-nanosecond), which means less time is needed for energy supply to the signal generator and the PA. On the other hand, variable carrier frequency waveforms such as LFW, FMCW and SFCW need a longer time (compared to CW) to complete sweeping of defined frequency band (i.e., the carrier frequency is changing from one frequency to another in a continuous or in a discrete manner).

If the power supply duration is less restrained, such as due to a more powerful power supply allowed by regulation and also a longer time for the same current or voltage supply allowed by the application (e.g., 20 milli-Ampere (mA) for a longer time vs. 4 mA for a shorter time) allowing for a longer pulse time, a wider pulse with a LFM waveform inside the pulse can be selected. In this situation, the pulse width can be as large as a few milliseconds, corresponding to a pulse compression factor of >1,000,000, equivalent pulse width<1 ns. The LFM waveform is recognized to have the advantage of being able to use the FM technique to obtain high measurement resolution, and high SNR data at longer distance. LFM may be selected over FMCW or SFCW when the Tx turn-on time is allowed for <10 ms.

For applications dealing with a slow moving target (e.g., a speed of movement of a product liquid interface is <1 mm/second), when a relatively powerful power supply (typically encapsulated in explosion proof enclosure) is provided and there is a minimum of governmental regulation, a pulsed FMCW or a pulsed SFCW waveform can be selected. In this situation, the pulse width can be on the order of hundreds of milliseconds. The radar system in this case can be switched from time-domain based signal processing to frequency-domain based signal processing in which the discrete Fourier transform (DFT) and spectrum-based detection implemented by processor 140 may be used to identify the target position accurately. A large bandwidth of the transmitted signal can be obtained using pulsed FMCW or pulsed SFCW waveforms, typically >2 GHz. An advantage of these waveforms is high dynamic range and SNR.

Conditions present can be used to select between FMCW and SFCW. For example, SFCW involves a phase lock loop (PLL) to lock each frequency which takes a longer time to completely go through the entire frequency band, while an advantage is that each frequency signal is coherent and known. Another advantage of SFCW is that it can achieve a very large frequency band (e.g., >4 GHz) with high linearity. FMCW is generally faster than SFCW, with each individual frequency not locked via a PLL, rather the frequency-time slope of the sweep is controlled or locked.

Disclose systems can operate using a wide range of pulse frequencies. One embodiment utilizes a carrier frequency at K-band (18 GHz to 27 GHz), but the carrier frequency may also be at other bands. The radar pulses may comprise Ultra-WideBand (UWB) radar pulses. "UWB" as used herein refers to a pulse bandwidth of at least 0.5 Giga Hertz (GHz) or fractional bandwidth of at least 25% of the center frequency (which is based on the U.S. Defense Advanced Research Projects Agency's (DARPA's) UWB definition), while UWB ranges in frequency spectrum can be anywhere between 100 MHz and 300 GHz.

Regarding performance, as described more fully in the Examples section, (see Example 4), by having the power of the transmitted pulsed radar signal adjusted to be in harmony with the receiver gain and SNR, the estimated liquid level accuracy can be better than 2 mm at distance of 100 m between the transmitting antenna and the liquid in the storage tank with a liquid in the tank having a dielectric constant of 1.3.

FIG. 1A is a block diagram of an example adaptive pulsed multi-waveform radar system (radar system) 100 including a programmable transmitter (Tx) 190 having multiple waveform capability and a programmable receiver (Rx) 150, according to an example embodiment. The Rx 150 receives radar signals via antenna 175 reflected or scattered from a surface of a product material (liquid or a solid (e.g., powder)) in a storage tank responsive to transmitted radar signals which are emitted from antenna 175 (or another antenna) above the product material in the storage tank. Radar system 100 provides time-domain and frequency-domain based radar sensing and measurements using respective waveforms for applications including, but not limited to, distance, level, and signature determination. The respective blocks of disclosed radar systems can be realized as an integrated circuit (IC), or using discrete components.

Devices in radar system 100 that are common to both Tx 190 and Rx 150 include a processor 140 (e.g., a DSP or MCU), and a multi-channel digital-to-analog converter (DAC) 143. The processor 140 is shown coupled to the complex programmable logic device (CPLD) timing/control algorithm block 148. CPLD timing/control algorithm block 148 provides functions including automatically selecting (or switching) the waveform type (e.g., pulsed FMCW mode operation or pulsed CW mode operation), as well optionally adjusting the pulse amplitude (via multi-channel DAC 143) and pulse width (via trigger signal Tx 111) of the transmitted pulsed radar signal.

Tx 190 includes a trigger signal Tx generator 111, and a trigger signal Tx oscillator 112 which when active Tx 190 provides pulsed CW waveforms from a fixed output of the DAC 113. DAC 113 also provides a variable output, and using the variable output can generate pulsed LFM, pulsed FMCW, or pulsed SFCW signals, respectively.

The pulse duration is controlled by triggering signal oscillator 112, and the waveform is controlled by DAC 113. A carrier frequency generator 120 receives inputs from trigger signal Tx oscillator 112 and the DAC 113 and its output is coupled to a programmable power amplifier (PA) 125. Carrier frequency generator 120 can comprise a local voltage controlled oscillator (VCO). Based on CPLD timing/control algorithm block 148 control, when the output of DAC 113 varies by means of the control algorithm, Tx 190 transmits pulsed LFW, pulsed FMCW or pulsed SFCW signals, while when the output of DAC 113 is constant, Tx 190 transmits pulsed CW signals or pulses over a CW carrier.

An output of the multi-channel DAC 143 and the output of the trigger signal Tx generator 111 are coupled to respective inputs of PA 125. Trigger signal Tx generator 111 controls the duration of the pulse amplified by PA 125, and the pulse amplitude is controlled by control information from the multi-channel DAC 143 which controls the generated signal power provided by PA 125. The output of the PA 125 is connected to a coupler 160 which is connected to antenna 175. Although a single antenna 175 is shown for radar system 100 that is utilized by both Tx 190 and Rx 150, Tx 190 and Rx 150 may include separate antennas, which allows the coupler 160 to be removed.

The Rx 150 receives reflected or scattered signals from the surface of the product material in the storage tank responsive to transmitted pulsed radar signals via antenna 175 to coupler 160. The coupler 160 is connected to a PGN block 135 (see FIG. 1B described below for more details regarding PGN block 135 and associated devices).

The output of the PGN block 135 is shown coupled to a mixer 185 of a sampling unit 146, where the sampling unit 146 comprises sampling and hold (S&H) circuitry 170, an optional offset/gain control block 180 and an analog-to-digital converter (ADC (145. Mixer 185 mixes the signal from the PGN block 135 with the signal from the carrier frequency generator 120 (which serves as a local oscillator). The trigger signal Rx 155 functions to control the opening and closing of the mixer 185 selectively.

The S&H circuitry 170 and ADC 145 are controlled by CPLD timing/control 148 in a harmonized way to digitize the output signal generated by mixer 185. The digitized output of mixer 185 is coupled to the processor 140, which performs relevant processing tasks for the signals received. Optional offset/gain control block 180 receives the output signal from the synchronized S&H 170, and applies offset and/or gain control based on the control signal provided by CPLD timing/control algorithm block 148, which is controlled by processor 140. The output of offset/gain control block 180 is coupled to an input of the ADC 145, whose output is coupled to the processor 140.

Figure 1B:
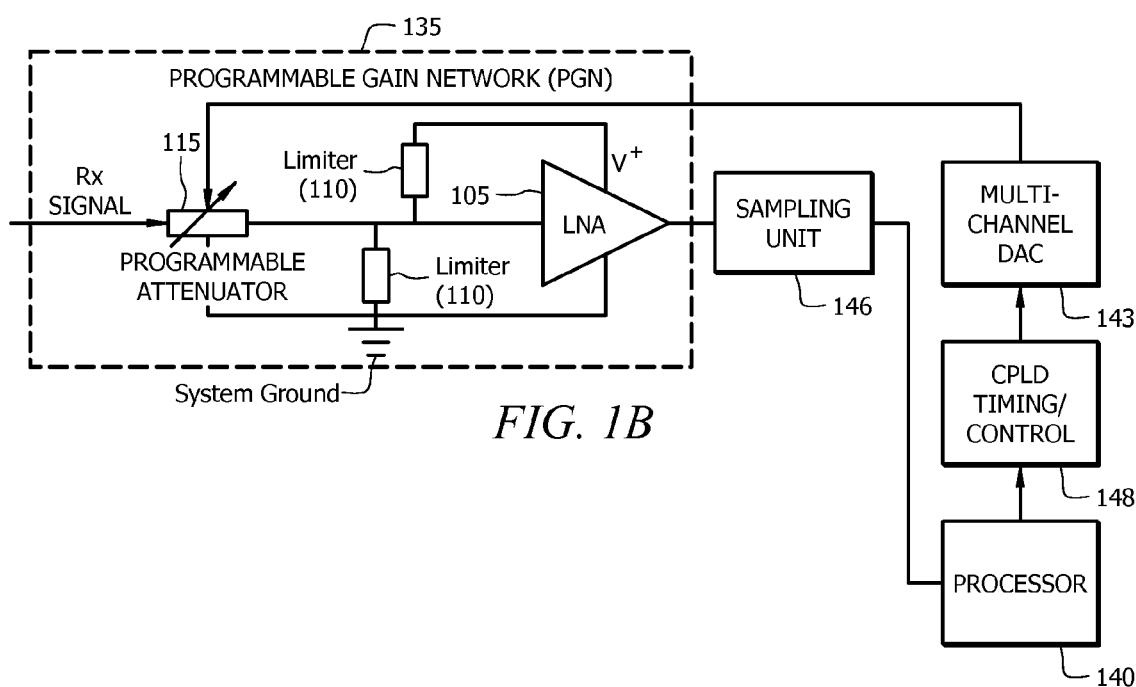
FIG. 1B is a block diagram depiction of a portion of an example programmable Rx including a programmable gain network (PGN) block, according to an example embodiment.
Figure 2A:
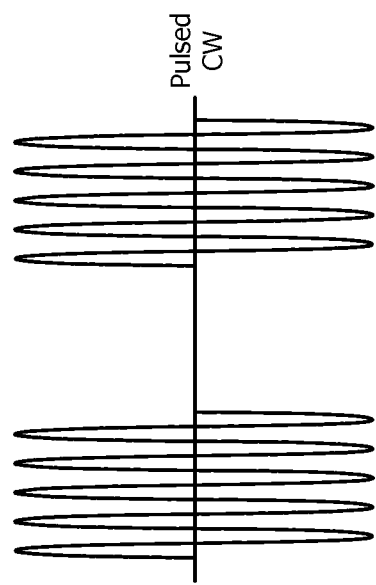
FIGS. 2A-2D show example waveforms including a pulsed continuous wave (CW) waveform, a pulsed linear frequency modulation (LFM) waveform, a pulsed stepped frequency CW (pulsed SFCW) waveform, and a pulsed frequency-modulated CW (FMCW) waveform, respectively, that can be generated and automatically and adaptively switched to by disclosed programmable Txs, according to an example embodiment.
Figure 2B:
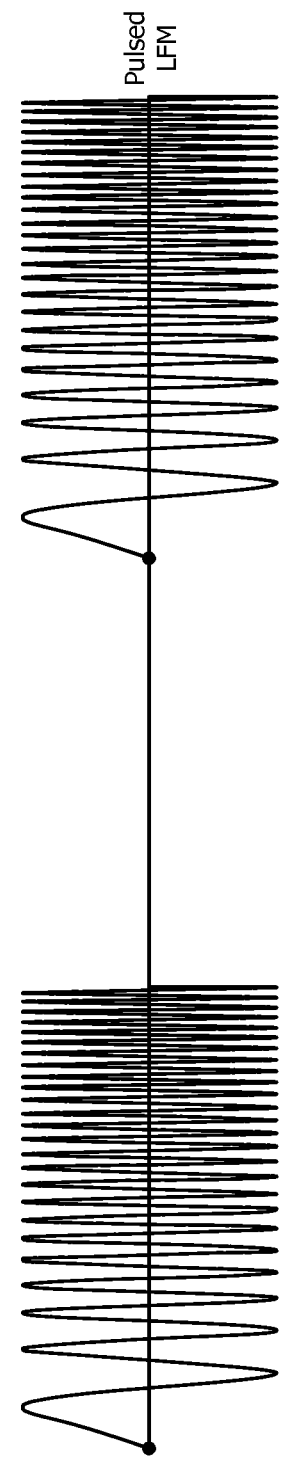
Figure 2C:
Figure 2D:
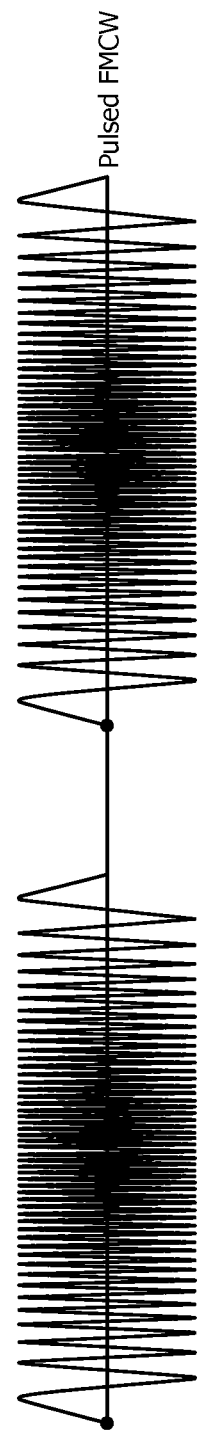

FIG. 1B is a block diagram depiction of a portion of an example programmable Rx including a PGN block 135 along with a sampling unit 146. Also shown is processor 140, CPLD 148 and multi-channel DAC 143, where multi-channel DAC 143 is shown coupled to control the attenuation of programmable attenuator 115. PGN block 135 includes a front-end conditioner including the programmable attenuator 115 and at least one fast acting power limiter 110 (front-end conditioner is the combination 115/110). The power limiter 110 placed between the input node of LNA 105 and a ground node for the radar system functions to protect the LNA 105 from large magnitude crosstalk signals (see FIG. 3 zone 1, described below) and reflections from obstructions in the tank or container.

An optional second power limiter 110 can also be added between the input node of the LNA 105 and the system positive power supply (V+) or other voltage so that the input signal to the LNA 105 can be clamped to a predetermined voltage value as shown in FIG. 1B. It is noted the power limiter 110 is generally used in the design to limit the power of the input signal to the LNA 105 to about −10 dBm (70 mV). It is generally acceptable to place a power limiter 110 directly between the input to the LNA 105 and the system ground line. For other input bias situations to the LNA 105, an optional second power limiter can be placed to also clamp the voltage of the maximum input to the LNA 105 whose value may be variable from design-to-design.

As used herein a "LNA" refers to a special type of electronic amplifier used in communication systems which amplifies very weak signals captured by an antenna. When using a LNA, circuitry is configured so that noise figure is reduced by the gain by the amplifier while the noise of the amplifier is injected directly into the received signal.

Regarding the design of the front-end conditioner 115/110, after a pulse is emitted by the antenna 175 driven by the Tx circuitry through coupler 160, the Rx circuitry will begin to be exposed to crosstalk signals from Tx 190, followed by incoming signals received by antenna 175 (or other antenna for separate Rx and $T_x$ antenna system embodiments) usually including the cross coupling signals, and then the target signal from the target surface reflections are received.

The power limiter 110 being placed between the input node of the LNA 105 and the system ground node can shunt away power in the received signal only when the magnitude of the signal voltage at this node is above a certain level. Power limiter 110 can thus clamp the power level at the input node of the LNA 105. Having both the first and second power limiter 110 shown in FIG. 1B can provide the option of bidirectional protection for the LNA 105. The limiter 110 circuitry is selected to react as a shunt fast, acting fast enough to protect circuitry of the LNA 105 from damage and/or deep saturation, and for certain applications needing fast action, such as when the target is relatively close to the antenna.

Also a short recovery time may be needed in order to obtain the target signal without distortion. For instance, if a short pulse has an equivalent duration of a 1 ns monocycle pulse, the recovery time of the limiter 110 should generally be less than the equivalent pulse duration, such as at most 0.5 ns (≤½ the equivalent pulse duration). The power limiter 110 can also be selected to clamp strong (high power) received signals, and the clamping level provided should generally be less than the maximum linear input of the LNA 105.

The power limiter 110 can be selected from several devices including Schottky double barrier diodes which provide ultra high-speed switching when oriented to be forward biased. Depending on the signal polarity, one power limiter 110 can be placed between the input node of the LNA 105 and the system ground to provide unidirectional protection and for bidirectional protection a second power limiter can be added between the input node of the LNA 105 and the positive power supply (V+), or other voltage so that the input signal to the LNA 105 can be clamped onto a predetermined |maximum| voltage value; to provide protection for signals with the other polarity to enable bidirectional protection. The power limiter 110 is generally a passive device that only becomes active when the signal voltage exceeds the voltage threshold of the power limiter 110.

The adjustable gain (or attenuation) provided by the PGN block 135 is provided for this purpose. The processor 140/ CPLD 148/multi-channel DAC 143 causes the PGN block 135 to operate in a low gain or an attenuation level when the received radar signals are above a predetermined signal level (e.g., cross coupling signals), and at a higher gain level when the received radar signal is below the predetermined signal level. (e.g., target signals reflected from dielectric material and/or from farther away). Disclosed radar systems having disclosed PGNs thus enable using short pulses to measure longer distances at higher accuracy at the same time as compared to conventional fixed receiver gain arrangements.

FIGS. 2A-2D shown example waveforms including a pulsed CW waveform, a pulsed LFM waveform, a pulsed SFCW waveform, and a pulsed FMCW waveform, respectively, that can be generated and be automatically and adaptively switched to by disclosed programmable Txs, according to an example embodiment. The pulsed CW waveform in FIG. 2A evidences a continuous sinusoid wave at a constant frequency versus time that is advantageous in that it takes a relatively short time for a higher frequency carrier such as a K-band carrier to transmit a short pulse. The pulse width of the CW radar pulse can be tens or hundreds of picoseconds, corresponding to 3-dB bandwidth of at least 2 GHz. The radar system signal processing for pulsed CW operation is time-domain processing.

If the power supply duration is less restrained (e.g., longer time), a wider pulse (compared to the tens or hundreds of picoseconds for a pulsed CW waveform) with an LFM waveform inside the pulse can be selected. In this situation, the pulse width can be as large as a few milliseconds, corresponding to a pulse compression factor of >1,000,000, equivalent to a pulse width<1 ns. The waveform has advantage of using frequency modulation technique to obtain high resolution, high SNR data at longer distance. The radar system signal processing for pulsed LFM operation is time-domain correlation processing.

For applications dealing with a slow moving target, pulsed SFCW (see FIG. 2C) or pulsed FMCW (see FIG. 2D) waveforms can be selected. In the slow moving situation, the pulse width can be on the order of hundreds of milliseconds. The radar system signal processing for pulsed SFCW or pulsed FMCW operation is frequency domain-based processing. A large bandwidth transmitted signal can be obtained, typical >2 GHz.

An advantage of pulsed SFCW and pulsed FMCW waveforms is high dynamic range and SNR. In contrast, regarding the pulsed CW waveform shown in FIG. 2A, if the power supply for radar is very limited, such as an 4-20 mA loop power, then the waveform will be a shorter pulse with the CW waveform inside the pulse. In this situation, the pulse width of the radar pulse can range from tens to hundreds of picoseconds, corresponding to 3-dB bandwidth of at least 2 GHz. For pulsed SFCW waveform, it is realized in discrete frequencies (e.g., controlled using a phase lock loop (PLL) that for each discrete frequency needs time to establish a stable and coherent output signal and time to measure the signal returns (e.g., reflections). SFCW and related frequency hopping thus provides knowledge of each individual frequency which improves system performance over FMCW, but generally takes more time to traverse the bandwidth as compared to FMCW.

Figure 3:
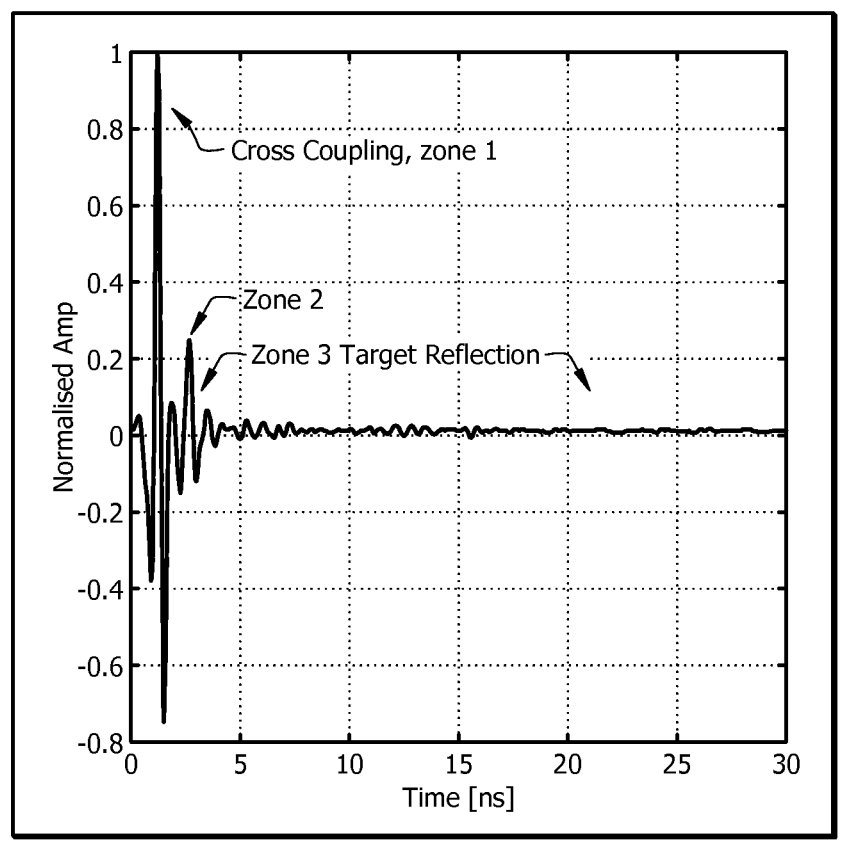
FIG. 3 shows the relative amplitude of a received and sampled radar signal (without signal processing) responsive to a pulsed radar signal incident in a storage tank having liquid product therein for radar detection process as a function of time showing three (3) time zones.

FIG. 3 shows the relative amplitude of a received and sampled radar signal (without signal processing) responsive to a pulsed radar signal incident in a storage tank having liquid product therein for radar detection process as a function of time, where the time window for the radar detection process is shown divided into three zones. The first zone contains the relatively high amplitude (high power) cross coupling signals. The second time window includes reflections from the launcher and/or feed-through. The third time zone comprises the returns of object (target) reflections. By a proper configuration, which can be based on the calibration of internal hardware in the radar system 100, or by design specifications for the radar system, appropriate adjustments can be made to the signal processing provided by processor 140. More configuration details are described in the paragraphs below. Each zone shown in FIG. 3 can be configured to have a separation in time, and thus be processed with different system settings. The PGN block 135 will generally be able to make the three zones shown in FIG. 3 be fit into the dynamic range of the sampling unit 146, which can be about 60 to 80 dB to acquire sub-nanosecond signals.

At the beginning of the radar detection process, corresponding to the first zone in FIG. 3, the initial attenuation setting for the programmable attenuator 115 can be set by processor 140 to a maximal value. By the time the acquired waveform should be displayed (typically nothing would appear on the display because of the large attenuation of the initial attenuation setting), the attenuation setting for the programmable attenuator 115 can be adjusted to a lower value in a predefined step to collect the signals using internal coupling signal which provides a known (fixed) time delay in the first zone, such as for calibration purposes. The wavelets in this part of the time window can be acquired under about a 60-dB dynamic range. After this, the attenuator setting for the programmable attenuator 115 can be changed to a new lower attenuation value in order to acquire the signals in the second zone.

It is noted that during the time of the second zone with the new lower attenuation value for the programmable attenuator 115, the power of the signals within the first zone might have been large enough to make the LNA 105 become saturated or damaged. However saturation or damage will not occur because the power limiter 110 will generally activate fast enough and shunt away sufficient power to prevent the LNA 105 from saturation and damage. The recovery time of the power limiter 110 will generally be short enough when compared to the time separation between the adjacent zones. Likewise, the programmable attenuator 115 can be switched by processor 140 and control unit 148 and multi-channel DAC 143 to another lower attenuation value to let the weak target signals reflected or scattered from the target that is a bit farther away to be acquired. Each data sample (e.g., one per time interval/zone) can thus include a quantized amplitude and a corresponding attenuator setting or gain setting in the data profile.

Depending upon the situation present, the time window can be divided into more than the three zones shown in FIG. 3. A significant feature for power limiter 110 is that its recovery time should be less than the time separation between adjacent zones. The programmable attenuator 115 may need a longer time for switching between two values. However, in this design this generally is not a problem because, for example, the PRF (pulse repetition frequency) of the short pulse generator is $f_{prf}$. Each zone corresponds to a sampling window. The number of sampling points in each zone (sampling window) is assumed to be $N_i$. The time ($T_i$) which is available for the programmable attenuator 115 to switch is given by:

$$T_i = \frac{A_g N_i}{f_{prf}}$$

In order to reduce the thermal noise level, the values at each sampling position can be averaged over a number ($A_g$) of acquired values. Given $A_g$=10, $f_{prf}$=2 MHz, $N_i$=2000, which are ordinary/typical values, $T_i$ is 10 ms. 10 ms is generally long enough for most programmable attenuators to be set to another value for another zone or sampling window.

The timing required for a disclosed conditioning device combination 115/110 depends on the propagation time from the moment at which energy is radiated from the transmitting antenna (175 in FIG. 1) to the moment at which the scattered/reflected electromagnetic energy is captured by the receiving aperture, which is also antenna 175 as shown in FIG. 1. Once the configuration of the antenna 175 is accomplished, the maximal signal level in the first two zones will generally be determined. The attenuation setting for the programmable attenuator 115 can be set properly with this information. Therefore it may be unnecessary to set the attenuation of the programmable attenuator 115 to the maximum value at the beginning of measurements. For obtaining the attenuator settings for the programmable attenuator 115 for the other zones, experiments and experience can be used.

Functions of the conditioning device combination 115/110 to address different application scenarios can include the following:

1. The maximum limited clamping level can be set so that the received signal level is less than the level of the 1-dB compression point (i.e., P1) of the LNA 105.
2. When large amplitude useful signals are being received, clipping it by the power limiter 110 prevents the LNA 105 from saturation/damage. A device for the power limiter 110 can be selected to clip instead of shunt all power based on the choice of LNA 105 that normally provides its P1 value on its specification data sheet. If one desires linear undistorted unclipped signals, then the programmable attenuator 115 can be tuned with a higher attenuation level to lower the signal amplitude so that the power limiter 110 can be automatically deactivated. Power limiter 110 as noted above is generally passive device with fast recovery time<0.5 ns. When the signal level becomes below the power limiter's voltage, then the power limiter 110 will be rapidly recovered and become "inactive".
3. When small signals (e.g., target signals) are being received, the power limiter 110 does not get activated. The attenuation for the programmable attenuator 115 can be set to "0" (pass thru mode), and the gain of LNA 105 at a maximum. The gain of LNA 105 is generally either adjustable, or a fixed gain. It is noted LNA 105 can be constructed in single or in multiple series amplification stages.
4. When large crosstalk signals, etc. are being received, the power limiter 110 can automatically be activated to clip the large signals to prevent saturation (or damage) of the LNA 105. When a large crosstalk (cross coupling) signal is also wanted for a calibration purpose, the PGN block 135 can be adjusted to attenuate the signal by using attenuation from the programmable attenuator 115 while deactivating the power limiter 110, so that the large signal becomes available for calibration essentially without distortion.

Figure 4:
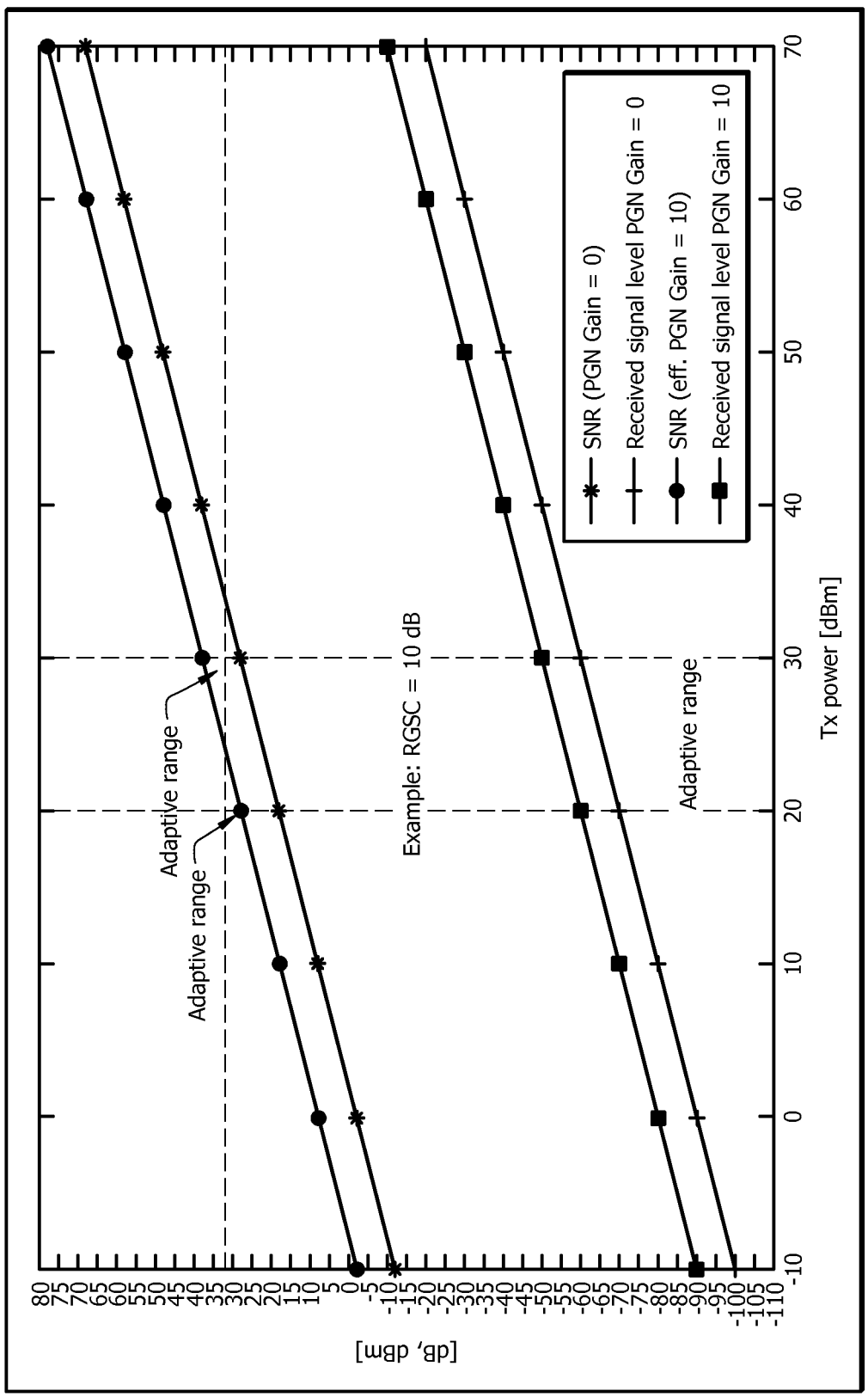
FIG. 4 provides data showing disclosed adaptive pulsed multi-waveform radar systems having a programmable Rx and programmable Tx that evidences high SNR detection of a product material in a storage tank that had a dielectric constant of 1.3 at a distance from the transmitting antenna to the product material of about 100 m by having the power of the transmitted pulsed radar signal adjusted to be in harmony with the receiver gain and SNR, according to an example embodiment.

FIG. 4 is data showing disclosed adaptive radar systems having a programmable Tx and a programmable Rx, according to an example embodiment. This example shows the power of the transmitted pulsed radar signal being adjusted in harmony with the receiver gain and sensitivity control (RGSC) provided by PGN block 135. The x-axis is the Tx power in dBm and the pulsed CW radar (see FIG. 2A). The units of the y-axis are noted as dBm for the received signal, and dB for the SNR. This example evidences least 25 dB of SNR detection for a liquid product material such as petrochemical product in a storage tank that had a dielectric constant of 1.3 at a distance of 100 m from the transmitting antenna. In order to obtain at least 25 dB SNR over a large dynamic range, the Tx power is adaptively tuned over the so-called "adaptive range" shown as an example in FIG. 4 as being 20 to 30 dBm.

In system operation, at each Tx power level, the gain of the PGN block 135 can be automatically adjusted so that the minimum detectable signal has SNR of at least 25 dB to ensure the required accuracy of the level measurements within 2 mm. As seen in FIG. 4, for Tx power up to 30 dBm, with the PGN block 135 having a gain=0, the SNR is well below 25 dB. To obtain a good level accuracy of 2 mm, at least about 25 dB SNR is generally needed.

However, the Tx power can be limited by various limitations (such as government regulations), so the TX power can be limited, such as to 30 dBm. Using the PGN block 135 with an effective gain=10 dB, the SNR (for fixed Tx power) can be seen to be increased about 10 dB higher than with the PGN block 135 with a gain=0, and the SNR can be seen to become 25 dB for 20 dBm TX power (and 35 dBm for 30 dBm TX power). For a short pulse with a CW carrier, the improved SNR is important to deal with a high dynamic range of the signal received. Although in pulsed LFW, FMCW or SFCW radars, the duration of the pulsed signal is longer as compared to pulsed CW, the above-described adaptation remains applicable.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. An adaptive pulsed radar method of sensing or measuring a product material in a storage tank, comprising:
   adaptively and automatically selecting between a first of a plurality of waveform types based on a power limitation for an adaptive pulsed multi-waveform radar system having a programmable receiver (Rx) and a programmable transmitter (Tx) implementing said method;
   automatically setting an initial gain or attenuation for said programmable Rx;
   transmitting a pulsed radar signal using said first waveform type to said product material, wherein said pulsed radar signal is reflected or scattered by said product material to provide a radar signal during an interval of time including a target signal;
   said programmable Rx receiving said radar signal including said target signal during said interval of time, and
   signal processing said target signal with a lower attenuation setting compared to said initial gain or attenuation to determine at least one parameter associated with said product material.

2. The method of claim 1, further comprising automatically determining a transmit power for said pulsed radar signal using said first waveform type based on a predetermined signal to noise ratio (SNR) level and said SNR level versus Tx power data obtained from processing received radar signals responsive to said pulsed radar signal using said first waveform type transmitted to said product material in said storage tank.

3. The method of claim 1, wherein said power limitation comprises a duration and/or amplitude of a current or voltage supply provided to said radar system, or a government-imposed radiation power limitation.

4. The method of claim 1, wherein said programmable Rx includes a programmable gain network (PGN) block coupled to process said radar signal including said target signal, said PGN block including a programmable attenuator having an output coupled to an input node of a low noise amplifier (LNA), and at least one power limiter between said input node and a ground for said radar system, and an analog to digital sampling unit coupled between an output of said LNA and a processor,
   said processor implementing an attenuation algorithm,
   wherein said processor is coupled to said programmable attenuator and provides attenuation control signals to dynamically control said attenuation of said programmable attenuator.

5. The method of claim 4, wherein during a first time interval of said interval of time wherein said target signal is not present, automatically setting said programmable attenuator to an attenuation level, and
   during a subsequent time interval after said first time interval during said interval of time which includes said target signal, automatically reducing an attenuation level of said programmable attenuator.

6. The method of claim 4, wherein a recovery time of said power limiter is less than an equivalent pulse duration of said radar signal.

7. The method of claim 4, wherein said power limiter comprises at least one Schottky double barrier diode.

8. The method of claim 4, wherein said at least one power limiter comprises a first power limiter between said input node and said ground for said radar system and a second power limiter between said input node and said another voltage terminal so that the input signal can be limited to a higher voltage value used in said radar system.

9. The method of claim 1, further comprising automatically switching from said first waveform type to another of said plurality of waveform types for said pulsed radar signal based on a change in said power limitation.

10. An adaptive pulsed multi-waveform radar system for sensing or measuring a product material in a storage tank, comprising:
   a processor coupled to a complex programmable logic device (CPLD) timing/control block,
   a programmable transmitter (Tx) including a digital to analog converter (DAC) having an input coupled to said CPLD timing/control block and an output coupled to a carrier frequency generator, said carrier frequency generator coupled to a programmable power amplifier (PA) which is coupled to an antenna for transmitting a pulsed radar signal to said product material;
   said processor adaptively and automatically selecting between a first of a plurality of waveform types based on a power limitation for said radar system via said CPLD timing/control block providing a control signal to select between multiple waveform generators providing said plurality of waveform types via said DAC, a multi-channel digital to analog converter (DAC) having an input coupled to said CPLD timing/control block and an output to a programmable gain network (PGN) block and said programmable PA, and a trigger signal Tx generator having an input coupled to said CPLD timing/control block coupled to a first input of said programmable PA;
   wherein said pulsed radar signal using said first waveform type after transmission is reflected or scattered by said product material to provide a radar signal during an interval of time including a target signal; and
   a programmable receiver (Rx) including said PGN block coupled to process said radar signal received from said antenna or another antenna, said PGN block including a programmable attenuator having an output coupled to an input node of a low noise amplifier (LNA), and at least one power limiter between said input node and a ground for said radar system, and a sampling unit including said mixer and an analog-to-digital converter (ADC) coupled between said PGN block and said processor; said sampling unit coupled between an output of said LNA and said processor,
   said processor implementing an attenuation algorithm,
   wherein said processor is coupled to said programmable attenuator and provides attenuation control signals to dynamically control an attenuation of said programmable attenuator while processing said radar signal during said interval of time including an initial gain or attenuation signal and a later lower attenuation setting, and
   wherein said processor provides signal processing of said target signal using said lower attenuation setting to determine at least one parameter associated with said product material.

11. The radar system of claim 10, wherein said multiple waveform generators include at least a pulsed linear frequency modulated (LFM) generator, pulsed stepped frequency CW (SFCW) generator, and pulsed frequency-modulated (FMCW) generator all provided via a variable output of said DAC, and a pulsed continuous wave (CW) generator provided via a fixed output of said DAC.

12. The radar system of claim 10, wherein said multi-channel DAC controls a transmit power for said pulsed radar signal based on a signal to noise ratio (SNR).

13. The radar system of claim 10, wherein said power limiter comprises at least one Schottky double barrier diode.

14. The radar system of claim 10, wherein said processor through said CPLD timing/control block implements automatically switching from said first waveform type to another of said plurality of waveform types for said pulsed radar signal based on a change in a power limitation.

15. The radar system of claim 10, wherein said pulsed radar signal comprises Ultra-WideBand (UWB) radar pulses.

* * * * *